(12) United States Patent
Stauffer

(10) Patent No.: US 7,856,944 B1
(45) Date of Patent: Dec. 28, 2010

(54) PET FOOD FEEDING DISH

(76) Inventor: Gregory Stauffer, 315 Manor Ridge Dr., Akron, PA (US) 17502

( * ) Notice: Subject to any disclaimer, the term of this patent is extended or adjusted under 35 U.S.C. 154(b) by 116 days.

(21) Appl. No.: 11/983,892

(22) Filed: Nov. 13, 2007

Related U.S. Application Data

(60) Provisional application No. 60/859,902, filed on Nov. 20, 2006.

(51) Int. Cl.
*A01K 5/00* (2006.01)

(52) U.S. Cl. .................. 119/61.5; 220/575; 220/529

(58) Field of Classification Search .............. 119/51.01, 119/61.5, 61.51–61.56; 209/373, 374; 126/377.1; 220/574, 4.27, 575, 527, 529, 503, 506
See application file for complete search history.

(56) References Cited

U.S. PATENT DOCUMENTS

| 2,213,837 | A * | 9/1940 | Gill .............................. 220/575 |
| 2,561,594 | A * | 7/1951 | Pokras ......................... 220/575 |
| 5,377,621 | A * | 1/1995 | Camm ........................ 119/61.54 |
| 6,135,307 | A * | 10/2000 | Fahy ............................ 220/574 |
| 6,314,911 | B1 * | 11/2001 | Kaytovich .................. 119/61.5 |
| 6,786,177 | B1 * | 9/2004 | Lemkin ...................... 119/51.01 |
| 6,945,195 | B1 * | 9/2005 | Morrison ...................... 119/707 |
| 7,146,934 | B1 * | 12/2006 | Staley .......................... 119/709 |
| 7,487,881 | B2 * | 2/2009 | Watzke et al. ............... 220/501 |
| 2008/0190374 | A1 * | 8/2008 | Farris ............................ 119/74 |
| 2009/0050633 | A1 * | 2/2009 | Knapp ......................... 220/575 |

OTHER PUBLICATIONS

Bubba's Love; Aug. 27, 2002; http://web.archive.org/web/20020827232705/bubbaslove.com/catniptins.htm; retrieved from internet: Dec. 22, 2009.*

* cited by examiner

*Primary Examiner*—Rob Swiatek
*Assistant Examiner*—Kristen C Hayes
(74) *Attorney, Agent, or Firm*—Norman E. Lehrer

(57) ABSTRACT

A pet food feeding dish includes a bowl having a generally concave portion, a rim extending along the periphery of said bowl, and a surrounding wall extending downwardly from the rim. The concave portion has a top surface and a bottom surface. A container or housing extends under the bowl downwardly from the bottom surface of the concave portion. Cat nip may be stored within the housing in order to attract a pet to the food contained bowl. The housing includes a main body portion and a cap that may be removably mounted to the main body portion. The cap includes a plurality of apertures therein for releasing the odor of the cat nip and the wall includes a plurality of openings around the periphery thereof so that the scent of the cat nip flows to the exterior of the bowl.

3 Claims, 2 Drawing Sheets

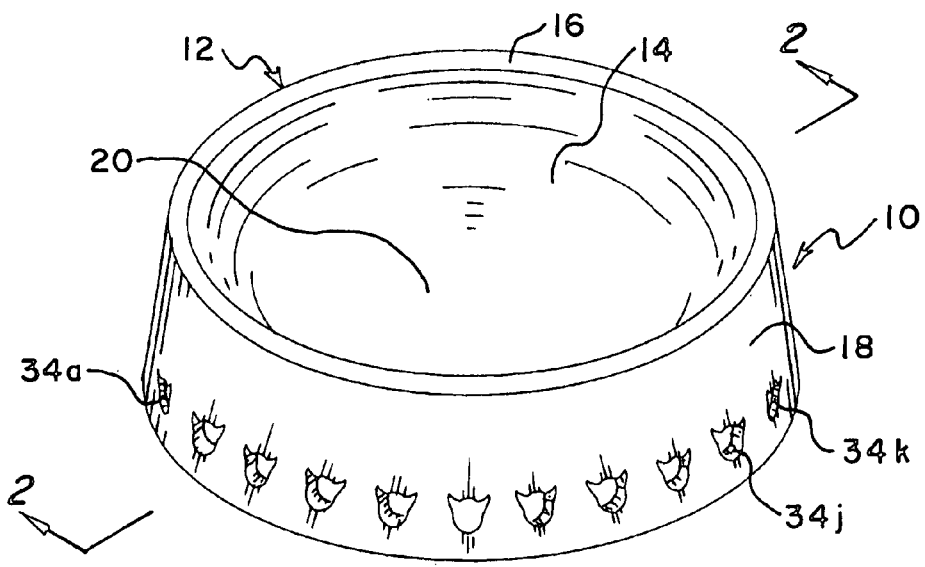
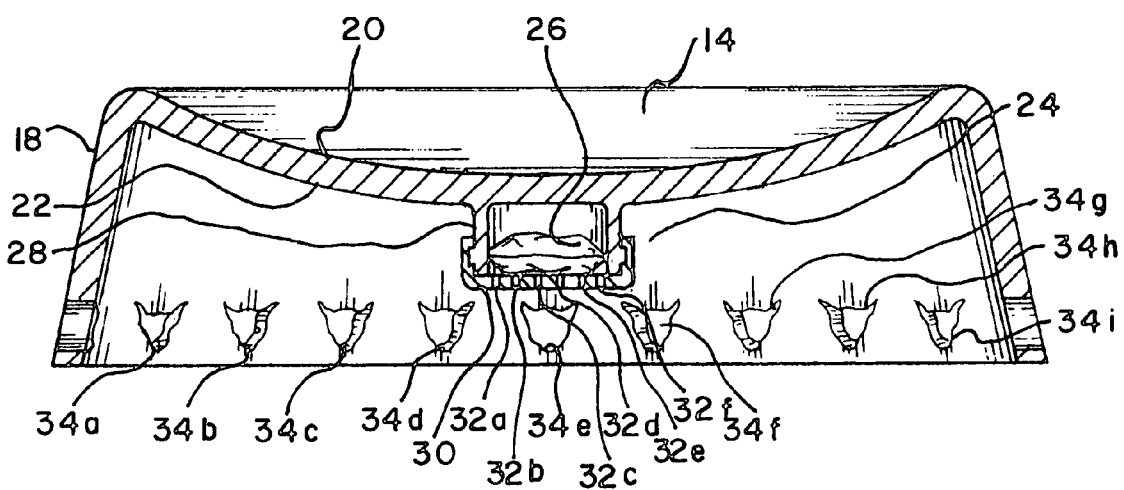

US 7,856,944 B1

PET FOOD FEEDING DISH

CROSS REFERENCE TO RELATED APPLICATIONS

This application claims the benefit of prior U.S. Provisional Application Ser. No. 60/859,902, filed Nov. 20, 2006.

BACKGROUND OF THE INVENTION

The present invention is directed toward a pet food feeding dish and more particularly, toward a pet food feeding dish that houses a scent that attracts a pet to the food placed within the dish.

Many households have at least one pet such as a dog or cat. Such animals may provide company, amusement, or personal security. However, owning a pet does involve a certain amount of responsibility. One obvious responsibility is providing the pet with proper nutrition. Proper nutrition in animals leads to a healthier and happier life for the animal. Also, proper nutrition may avoid future problems such as a pet owner having to care for an unhealthy pet which can become both heart breaking and expensive.

Some pets, however, are finicky or picky eaters. For example, some pets may leave their food in their bowls all day. This may create several problems for the pet owner in that the uneaten food may attract insects or rodents. Also, if other pets that aren't so finicky are present in the home, they may eat the unattended food. Furthermore, small children present in the home may be attracted to the food. Pet owners do not want to starve their pets but at the same time, leaving food out for a pet may create some undesirable and unwanted situations.

Providing a pet with snacks or human food mixed with or as a substitute to their own food may be a quick and easy solution for finicky eaters. However, these methods may not be the most nutritious or cost effective and may lead to more serious problems as discussed above.

Therefore, a need exists for a pet food feeding dish that attracts a pet to its food yet does not interfere with the nutritional value of the pet's food.

SUMMARY OF THE INVENTION

The present invention is designed to overcome the deficiencies of the prior art discussed above. It is an object of the present invention to provide a pet food feeding dish that attracts a pet to its food.

It is another object of the present invention to provide a pet food feeding dish that provides a storage area for cat nip or the like that is unobtrusive while using the dish.

It is a further object of the present invention to provide a pet food feeding dish that attracts a pet to its food yet does not interfere with the nutritional value of the pet's food.

In accordance with the illustrative embodiments demonstrating features and advantages of the present invention, there is provided a pet food feeding dish that includes a bowl having a generally concave portion, a rim extending along the periphery of said bowl, and a wall extending downwardly from the rim. The concave portion has a top surface and a bottom surface. A container or housing extends downwardly from the bottom surface of the concave portion. Means for attracting a pet to food contained within the dish is stored within the housing. The attracting means may be cat nip. The housing includes a main body portion and a cap that may be removably mounted to the main body portion. The cap includes a plurality of apertures that allows the scent of the cat nip to pass through. The lower portion of the dish wall includes a plurality of openings therearound so that the scent of the cat nip flows from beneath the dish to the exterior thereof around the dish.

Other objects, features, and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form that is presently preferred; it being understood that the invention is not intended to be limited to the precise arrangements and instrumentalities shown.

FIG. 1 is a front perspective view of the pet food feeding dish of the present invention;

FIG. 2 is a cross-sectional view of the pet food feeding dish taken through line 2-2 of FIG. 1;

DETAILED DESCRIPTION OF THE PREFERRED EMBODIMENT

Figure 3:
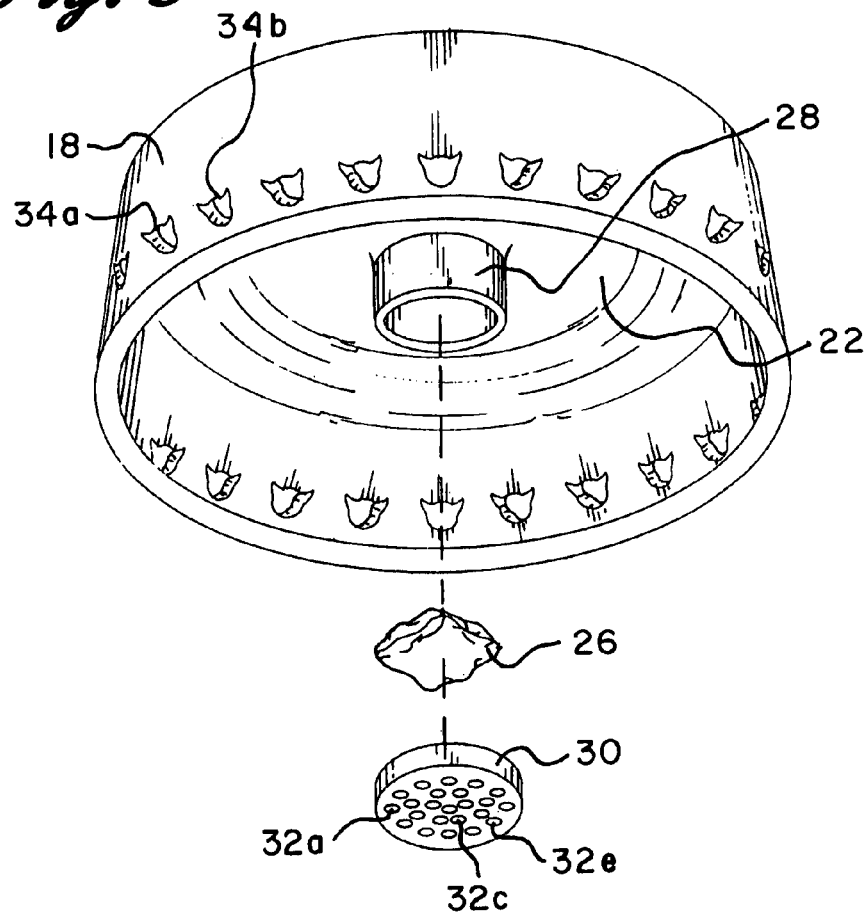
FIG. 3 is an exploded view of the pet food feeding dish of the present invention.

Referring now to the drawings in detail wherein like reference numerals have been used throughout the various figures to designate like elements, there is shown in FIG. 1 a pet food feeding dish constructed in accordance with the principles of the present invention and designated generally as 10.

The pet food feeding dish 10 of the present invention essentially includes a bowl 12 having a generally upwardly facing concave portion 14 having an upper edge, a rim 16 extending along the periphery of the bowl 12 at said upper edge, and a substantially vertical peripheral or outer wall 18 extending downwardly from the rim 16. The concave portion 14 has an upwardly facing top surface 20 that has no openings or is otherwise impervious and an impervious bottom convexly shaped surface 22. (See FIGS. 1 and 2.) As shown, however, the dish is otherwise essentially hollow beneath the undersurface 22. And, as further shown, the outer wall 18 extends below the convexly shaped bottom surface 22.

A container or housing 24 extends downwardly from the bottom surface 22 of the concave portion 14. (See FIG. 2.) As should be readily apparent to those skilled in the art, the main portion of the pet food feeding dish so far described including the bowl 12 and the housing 24 can be molded from plastic or similar material as a single unit. Alternatively, the parts can be separately molded and then assembled together in any known manner.

In any event, means 26 for attracting a pet to food contained within the bowl 12 can be contained within the housing 24. (See FIG. 3.) The attracting means 26 may be cat nip or some other material that emits a scent or odor that is pleasant or attractive to the pet.

The housing 24 is secured to the bottom surface 22 and includes a main body portion 28 and a cover or cap 30 that may be removably mounted to the main body portion 28 to cover the open end thereof. The cap 30 may be releasably secured to the main body portion 28 of the housing 24 by means of screw threads, a friction fit, or the like. The cap 30 includes a plurality of apertures 32a-32f, for example, that allow the scent of the cat nip or other odorous means to be released from the housing and enter the hollow space beneath the bowl 12. Alternatively, the cap 30 could be solid and the apertures could be formed in the downwardly extending cylindrical wall of the housing 24.

Figure 4:
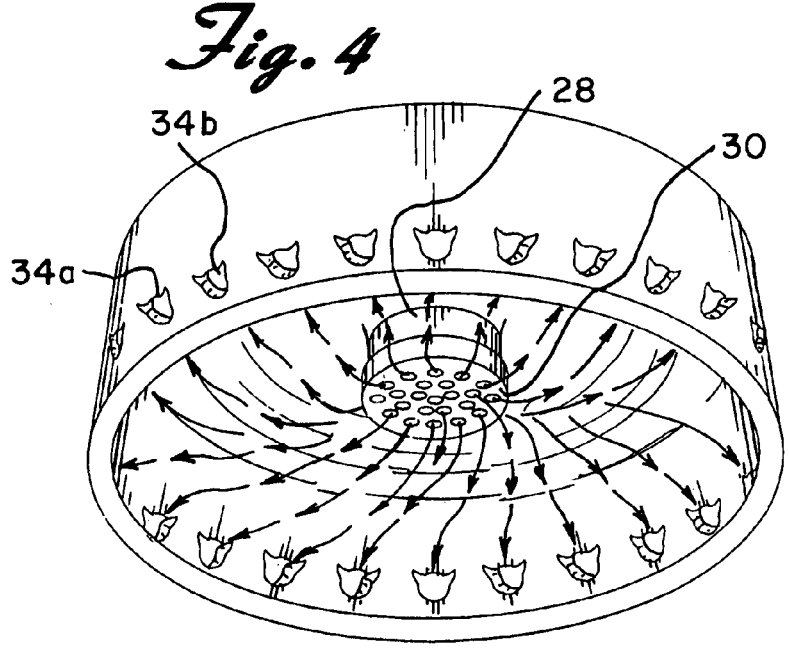
FIG. 4 is a bottom perspective view of the pet food feeding dish of the present invention.

The wall 18 surrounding the bowl 12 also includes a plurality of openings 34*a*-34*k*, for example, that extend therethrough. Preferably, the openings 34*a*-34*k* are located adjacent the bottom of the wall 18. In the embodiment of the invention shown in the drawings, the openings are in the design of the head of a cat. Obviously, this is by way of example as is the number and spacing of the openings. As should be readily apparent to those skilled in the art and as shown in the drawings, the openings 34*a*-34*k* allow the scent or odor of the cat nip 26 to be released to the outside of the bowl from the underside thereof. (See FIG. 4.)

In order to use the present invention, the dish 10 is inverted and the cap 30 is removed from the housing 24. The housing 24 is then filled with the desired amount of cat nip or other odorant. The cap 30 is then replaced and the dish placed in an upright position so that the bowl 12 may be filled with food. The pet will smell the attractive scent of the cat nip and approach the bowl in order to eat the food contained therein.

The present invention may be embodied in other specific forms without departing from the spirit or essential attributes thereof and accordingly, reference should be made to the appended claims rather than to the foregoing specification as indicating the scope of the invention.

I claim:

1. A pet food feeding dish comprising:
    a bowl having a generally upwardly facing concave portion having an upper edge; said concave portion having an upwardly facing impervious top surface throughout said entire concave portion; said bowl further including an impervious substantially convexly shaped bottom surface complementary to said concave portion;
    a rim extending along the periphery of said bowl at said upper edge;
    an outer wall secured to said rim, said outer wall surrounding said concave portion and extending downwardly from said rim to a position below said convexly shaped bottom surface;
    a housing secured to said convexly shaped bottom surface and including a side wall extending downwardly from said bottom surface, said housing including a main substantially hollow body portion formed by said side wall and said bottom surface, said main body portion having an open bottom, said housing further including a cap adapted to be removably attached to said open bottom for substantially closing the same;
    a plurality of apertures formed in one of said cap or side wall of said housing;
    odorous means contained within said housing for attracting a pet to food contained within said bowl, and
    a plurality of openings formed in said outer wall and passing therethrough, whereby odors from said odorous means can pass through said apertures and through said openings to the outside of said pet food feeding dish to attract a pet to the feeding dish.

2. The pet food feeding dish of claim 1 wherein said apertures are formed in said cap.

3. The pet food feeding dish of claim 2 wherein said openings are formed adjacent a bottom of said outer wall.

\* \* \* \* \*